(12) United States Patent
Shock (10) Patent No.: US 10,705,547 B2
(45) Date of Patent: Jul. 7, 2020

(54) MOBILE DISTRIBUTION STATION WITH GUIDED WAVE RADAR FUEL LEVEL SENSORS

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC, Birmingham, MI (US)

( * ) Notice: Subject to any disclaimer, the term of this patent is extended or adjusted under 35 U.S.C. 154(b) by 0 days.

(21) Appl. No.: 16/161,190

(22) Filed: Oct. 16, 2018

(65) Prior Publication Data

US 2019/0146525 A1  May 16, 2019

Related U.S. Application Data

(63) Continuation of application No. 15/673,796, filed on Aug. 10, 2017, now Pat. No. 10,303,190, which is a
(Continued)

(51) Int. Cl.
*G05D 9/12* (2006.01)
*G01S 7/00* (2006.01)
(Continued)

(52) U.S. Cl.
CPC ............... *G05D 9/12* (2013.01); *B67D 7/465* (2013.01); *G01S 7/003* (2013.01); *E21B 43/26* (2013.01);
(Continued)

(58) Field of Classification Search
CPC ...... B67D 7/465; G05D 9/12; Y10T 137/7306
(Continued)

(56) References Cited

U.S. PATENT DOCUMENTS 2,340,070 A   1/1944   McCauley et al.
2,516,150 A   7/1950   Samiran
(Continued)

FOREIGN PATENT DOCUMENTS

DE   1147397    4/1963
DE   20106400   10/2001
(Continued)

OTHER PUBLICATIONS

Oilfield Business: Technologies. Frac Shack Inc. introduces world's first Bi-Fuel Distribution Unit for hydraulic facturing industry. Texas Oil & Gas: The National Magazine for Oil & Gas in Texas. vol. 4, Issue 2. 2015. p. 27.
(Continued)

*Primary Examiner* — Kevin F Murphy
(74) *Attorney, Agent, or Firm* — Carlson, Gaskey & Olds, P.C.

(57) ABSTRACT

A distribution station includes a mobile trailer, a pump on the mobile trailer, a manifold on the mobile trailer and connected with the pump, a plurality of hoses connected with the manifold, a plurality of valves on the mobile trailer, each of the valves situated between the manifold and a respective different one of the hoses, a plurality of guided wave radar level sensors, each of the guided wave radar level sensors being associated with a respective different one of the hoses, and a controller configured to communicate with the guided wave radar level sensors and operate the valves responsive to signals from the guided wave radar level sensors.

12 Claims, 5 Drawing Sheets

Related U.S. Application Data continuation of application No. 15/290,331, filed on Oct. 11, 2016, now Pat. No. 10,289,126.

(51) Int. Cl.
  *B67D 7/46* (2010.01)
  *G01F 23/284* (2006.01)
  *F16K 31/06* (2006.01)
  *E21B 43/26* (2006.01)

(52) U.S. Cl.
  CPC ............ *F16K 31/06* (2013.01); *G01F 23/284* (2013.01); *Y10T 137/7306* (2015.04)

(58) Field of Classification Search
  USPC .................................. 324/118, 124; 403/369
  See application file for complete search history.

(56) References Cited

U.S. PATENT DOCUMENTS

| | | | |
|---|---|---|---|
| 2,769,572 A | 11/1956 | Harman et al. | |
| 2,777,461 A | 1/1957 | Wildhaber | |
| 2,966,921 A | 1/1961 | Whiteman | |
| 3,028,010 A | 4/1962 | Headrick | |
| 3,136,295 A | 6/1964 | Gramo | |
| 3,547,141 A | 12/1970 | Alexander | |
| 3,605,798 A | 9/1971 | Green et al. | |
| 3,618,643 A | 11/1971 | Thomson | |
| 3,625,399 A | 12/1971 | Heisler | |
| 3,656,134 A | 4/1972 | Brown | |
| 3,677,284 A | 7/1972 | Mendez | |
| 3,881,509 A | 5/1975 | Newton | |
| 4,139,019 A | 2/1979 | Bresie et al. | |
| 4,284,210 A | 8/1981 | Horak | |
| 4,511,311 A | 4/1985 | Olson | |
| 4,591,115 A | 5/1986 | DeCarlo | |
| 4,636,106 A * | 1/1987 | Waisbrod | F16B 7/10 403/221 |
| 4,651,788 A | 3/1987 | Grosskreuz et al. | |
| 4,728,005 A | 3/1988 | Jacobs et al. | |
| 4,930,665 A | 6/1990 | Devine | |
| 5,406,988 A | 4/1995 | Hopkins | |
| 5,454,408 A | 10/1995 | DiBella et al. | |
| 5,465,766 A | 11/1995 | Siegele et al. | |
| 5,503,199 A | 4/1996 | Whitley, II et al. | |
| 5,538,051 A | 7/1996 | Brown et al. | |
| 5,551,309 A | 9/1996 | Goossens et al. | |
| 5,651,400 A | 7/1997 | Corts et al. | |
| 5,660,358 A | 8/1997 | Grafwallner et al. | |
| 5,708,424 A | 1/1998 | Orlando et al. | |
| 5,749,339 A | 5/1998 | Graham et al. | |
| 5,927,603 A | 7/1999 | McNabb | |
| 5,884,675 A | 12/1999 | Krasnov | |
| 6,098,646 A | 8/2000 | Hennemann et al. | |
| 6,206,056 B1 | 3/2001 | Lagache | |
| 6,564,615 B1 | 5/2003 | Carter | |
| 6,601,000 B1 | 7/2003 | Barlian et al. | |
| 6,651,706 B2 | 11/2003 | Litt | |
| 6,697,705 B2 | 2/2004 | Johnson et al. | |
| 6,755,225 B1 | 6/2004 | Niedwiecki et al. | |
| 6,761,194 B1 | 7/2004 | Blong | |
| 6,779,569 B1 | 8/2004 | Teer, Jr. et al. | |
| 6,786,245 B1 | 9/2004 | Eichelberger et al. | |
| 6,867,729 B2 * | 3/2005 | Berry | G01F 23/284 342/118 |
| 7,063,276 B2 | 6/2006 | Newton | |
| 7,101,108 B1 * | 9/2006 | Chuang | E06B 9/38 403/227 |
| 7,106,026 B2 | 9/2006 | Moore | |
| 7,353,808 B2 | 4/2008 | Kakoo | |
| 7,392,699 B2 * | 7/2008 | Motzer | B08B 1/008 73/290 R |
| 7,401,511 B2 | 7/2008 | Dietmeier | |
| 7,415,995 B2 | 8/2008 | Plummer et al. | |
| 7,458,543 B2 | 12/2008 | Cutler et al. | |
| 7,568,507 B2 | 8/2009 | Farese et al. | |
| 7,610,806 B2 | 11/2009 | Skinner | |
| 7,602,143 B2 | 12/2009 | Capizzo | |
| 7,628,182 B2 | 12/2009 | Poulter | |
| 7,937,215 B2 | 5/2011 | Humphrey | |
| 7,938,151 B2 | 5/2011 | Hockner | |
| 8,448,750 B2 | 5/2013 | Gaugush et al. | |
| 8,959,998 B2 | 2/2015 | Birtcher et al. | |
| 9,346,662 B2 | 5/2016 | Van Vliet et al. | |
| 9,371,830 B2 | 6/2016 | Moffitt, Jr. | |
| 9,371,831 B2 | 6/2016 | Moffitt, Jr. | |
| 9,711,838 B2 * | 7/2017 | Heath | H01P 5/08 |
| 10,289,126 B2 * | 5/2019 | Shock | G05D 9/12 |
| 10,303,190 B2 * | 5/2019 | Shock | G05D 9/12 |
| 2001/0017815 A1 | 8/2001 | Ackermann et al. | |
| 2005/0109561 A1 | 5/2005 | Chopra | |
| 2007/0079891 A1 | 4/2007 | Farese et al. | |
| 2007/0164031 A1 | 7/2007 | Holz | |
| 2007/0181212 A1 | 8/2007 | Fell | |
| 2008/0078244 A1 | 4/2008 | Dietmeier | |
| 2010/0018605 A1 | 1/2010 | Bentivoglio | |
| 2011/0197988 A1 | 8/2011 | Van Vliet et al. | |
| 2016/0076533 A1 | 3/2016 | Moffitt, Jr. | |

FOREIGN PATENT DOCUMENTS

| | | |
|---|---|---|
| DE | 10309307 | 9/2004 |
| DE | 102006025025 | 12/2006 |
| DE | 102006038652 | 2/2008 |
| EP | 0161042 | 11/1985 |
| EP | 0433041 | 6/2001 |
| GB | 2485832 | 5/2012 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Service. Retrieved Aug. 23, 2016 from: http://www.fracshack.com.
Frac Shack International. Frac Shack Series—Series A. Retrieved Aug. 23, 2016 from: http://www.fracshack.com.
Frac Shack International. Frac Shack Series—Series B. Retrieved Aug. 23, 2016 from: http://www.fracshack.com.
Frac Shack International. Frac Shack Series—Series C. Retrieved Aug. 23, 2016 from: http://www.fracshack.com.
Frac Shack International. Frac Shack Series—Series D. Retrieved Aug. 23, 2016 from: http://www.fracshack.com.
Frac Shack International. Frac Shack Series—Series E. Retrieved Aug. 23, 2016 from: http://www.fracshack.com.
Frac Shack International. Frac Shack Series—Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.

(56) References Cited

OTHER PUBLICATIONS

Siemens. Sitrans G Continuous level measurement—Guided wave radar transmitters. Siemens FL Jan. 2013. pp. 208-238.
Shimazaki, H. (1986). Development of centralized fueling and management system of kerosene heating machine. Nisseki Technical Review, vol. 28(4). Jul. 1986. pp. 184-188.
Technical Document. Surface vehicle standard. SAE International. Sep. 2014. pp. 1-5.

* cited by examiner

MOBILE DISTRIBUTION STATION WITH GUIDED WAVE RADAR FUEL LEVEL SENSORS

CROSS-REFERENCE TO RELATED APPLICATION

The present disclosure in a continuation of U.S. patent application Ser. No. 15/673,796 filed Aug. 10, 2017, which is a continuation of U.S. patent application Ser. No. 15/290,331 filed Oct. 11, 2016.

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate semi-continuously, until refueling is needed, at which time the equipment may be shutdown for refueling. Shut-downs are costly and reduce efficiency. More preferably, to avoid shut-downs fuel is replenished in a hot-refueling operation while the equipment continues to run. This permits fracking operations to proceed fully continuously; however, hot-refueling can be difficult to reliably sustain for the duration of the fracking operation.

SUMMARY

A distribution station according to an example of the present disclosure includes a mobile trailer, a pump on the mobile trailer, a manifold on the mobile trailer connected with the pump, a plurality of hoses connected with the manifold, and a plurality of valves on the mobile trailer. Each of the valves is situated between the manifold and a respective different one of the hoses. A plurality of guided wave radar level sensors are associated with respective different ones of the hoses. A controller is configured to communicate with the guided wave radar level sensors and operate the valves responsive to signals from the guided wave radar level sensors.

In a further embodiment of any of the foregoing embodiments, each of the guided wave radar level sensors includes an elongated sensor probe and a sheath circumscribing the elongated sensor probe.

In a further embodiment of any of the foregoing embodiments, the sheath is spaced apart from the elongated sensor probe.

In a further embodiment of any of the foregoing embodiments, there is an annular gap between the sheath and the elongated sensor probe.

In a further embodiment of any of the foregoing embodiments, the sheath has a sheath length as the elongated sensor probe has a probe length, and the sheath length is equal to or greater than the probe length.

A further embodiment of any of the foregoing embodiments includes a bushing separating the sheath and the elongated sensor probe.

In a further embodiment of any of the foregoing embodiments, the bushing includes at least one vent.

In a further embodiment of any of the foregoing embodiments, each of the guided wave radar level sensors includes a sensor controller and the elongated sensor probe extends from the sensor controller to a tip end, and the bushing is located proximate the tip end.

In a further embodiment of any of the foregoing embodiments, each of the guided wave radar level sensors is hard-wired through a respective different one of hoses to the controller.

A further embodiment of any of the foregoing embodiments includes a plurality of sensor communication lines. Each of the sensor communication lines are connected or connectable with a respective different one of the guided wave radar level sensors, and each of the sensor communication lines are routed with a respective different one of the hoses.

A mobile distribution station according to an example of the present disclosure includes a pump, a manifold, a plurality of hoses, a plurality of detachably connectable fuel caps connected or connectable with the hoses, a plurality of valves, a plurality of guided wave radar level sensors, and a controller that is configured to operate the valves responsive to signals from the guided wave radar level sensors to provide fuel to the manifold, from the manifold to the valves, and from the valves through the hoses.

In a further embodiment of any of the foregoing embodiments, each of the guided wave radar level sensors includes an elongated sensor probe and a sheath circumscribing the elongated sensor probe.

In a further embodiment of any of the foregoing embodiments, the sheath is spaced apart from the elongated sensor probe.

In a further embodiment of any of the foregoing embodiments, there is an annular gap between the sheath and the elongated sensor probe.

In a further embodiment of any of the foregoing embodiments, the sheath has a sheath length as the elongated sensor probe has a probe length, and the sheath length is equal to or greater than the probe length.

A further embodiment of any of the foregoing embodiments includes a bushing separating the sheath and the elongated sensor probe.

In a further embodiment of any of the foregoing embodiments, the bushing includes at least one vent.

In a further embodiment of any of the foregoing embodiments, each of the guided wave radar level sensors includes a sensor controller and the elongated sensor probe extends from the sensor controller to a tip end, and the bushing is located proximate the tip end.

In a further embodiment of any of the foregoing embodiments, each of the guided wave radar level sensors is hard-wired through a respective different one of hoses to the controller.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
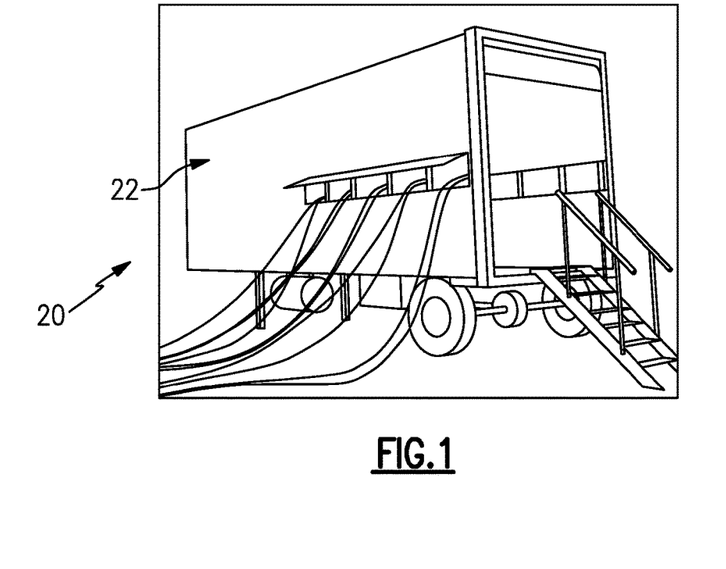
FIG. 1 illustrates an example mobile distribution station.
Figure 2:
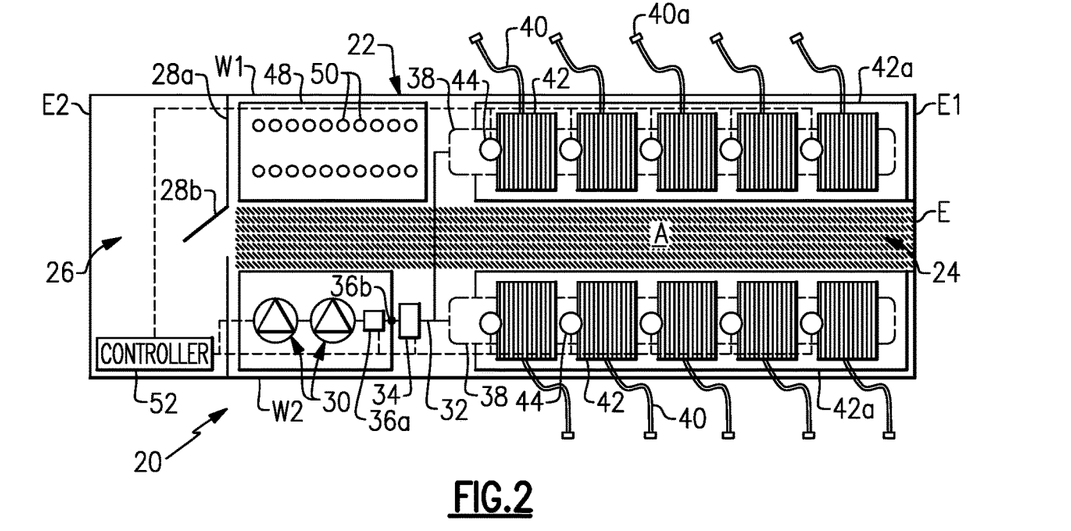
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations. In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28a that has an inside door 28b.

The first compartment 24 includes one or more pumps 30. Fuel may be provided to the one or more pumps 30 from an external fuel source, such as a tanker truck on the site. On the trailer 22, the one or more pumps 30 are fluidly connected via a fuel line 32 with a high precision register 34 for metering fuel. The fuel line 32 may include, but is not limited to, hard piping. In this example, the fuel line 32 includes a filtration and air eliminator system 36a and one or more sensors 36b. Although optional, the system 36a is beneficial in many implementations, to remove foreign particles and air from the fuel prior to delivery to the equipment. The one or more sensors 36b may include a temperature sensor, a pressure sensor, or a combination thereof, which assist in fuel distribution management.

The fuel line 32 is connected with one or more manifolds 38. In the illustrated example, the station 20 includes two manifolds 38 that arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40.

Figure 3:
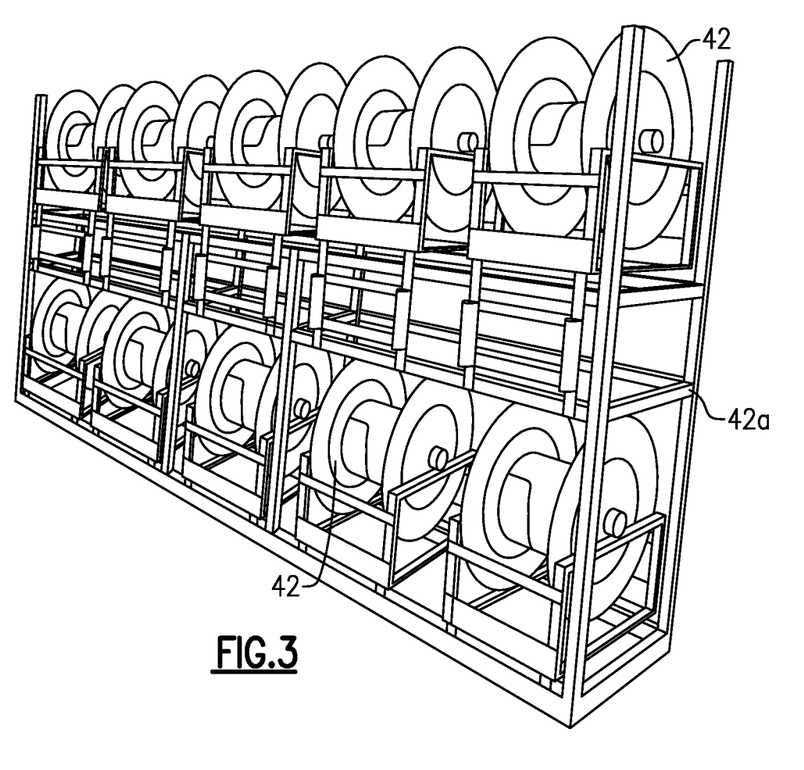
FIG. 3 illustrates an isolated view of hose reels on a support rack used in a mobile distribution station.

As shown in an isolated view in FIG. 3, the reels 42 are mounted on a support rack 42a. In this example, the support rack 42a is configured with upper and lower rows of reels 42. Each row has five reels 42 such that each support rack 42a provides ten reels 42 and thus ten hoses 40. There are two support racks 42a (FIG. 2) arranged on opposed sides of the first compartment 24, with an aisle (A) that runs between the support racks 42a from an outside door E to the inside door 28b. The station 20 therefore provides twenty hoses 40 in the illustrated arrangement, with ten hoses 40 provided on each side of the station 20. As will be appreciated, fewer or additional reels and hoses may be used in alternative examples.

Figure 4:
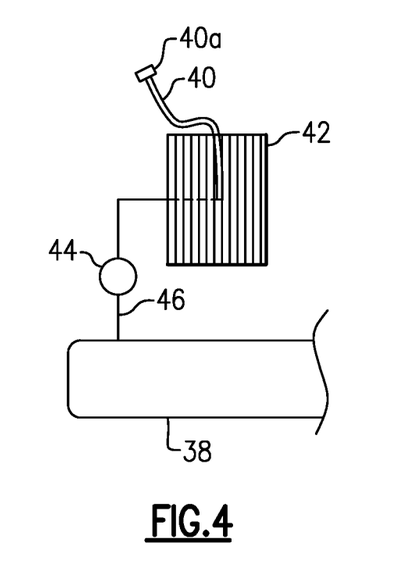
FIG. 4 illustrates an example of a connection between a manifold, a control valve, and a reel.

As shown in a representative example in FIG. 4, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40a and each integrated fuel cap sensor 50 may have a corresponding mating connector to facilitate rapid connection and disconnection of the hose 40 with the integrated fuel cap sensor 50. For example, the connector end 40a and mating connector on the integrated fuel cap sensor 50 form a hydraulic quick-connect.

At least the control valves 44, pump or pumps 30, sensor or sensors 36b, and register 34 are in communication with a controller 52 located in the second compartment 26. As an example, the controller 52 includes software, hardware, or both that is configured to carry out any of the functions described herein. In one further example, the controller 52 includes a programmable logic controller with a touch-screen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down. The controller 52 can also be programmed with a failsafe measure related to the operation of the fuel cap sensors 50. As an example, once a control valve 44 is open, if the controller 52 does not detect a change in fuel level from the fuel cap sensor 50 associated with the control valve 44 within a preset time period, the controller 52 shuts the pump 30 off and closes the control valve 44. Thus, if a hose 40 were to rupture, spillage of fuel is limited to the volume of fuel in the hose 40. For instance, the preset time period may be three seconds, six seconds, ten seconds, or fifteen seconds, which may limit spillage to approximately fifteen gallons for a given size of hose.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold 38 and fuel line 32 above a desired or preset pressure threshold to more rapidly deliver fuel. Similarly, the controller 52 may limit the number of control valves 44 that are open at any one instance in order to maintain the internal pressure in the manifold 38 and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here are a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

In general, hard-wiring in a hot-refueling environment presents several challenges. For example, a site has many workers walking about and typically is located on rough terrain. Thus, as will be described below, each integrated fuel cap sensor 50 is hard-wired through the associated hose 40 to the controller 52.

Figure 5:
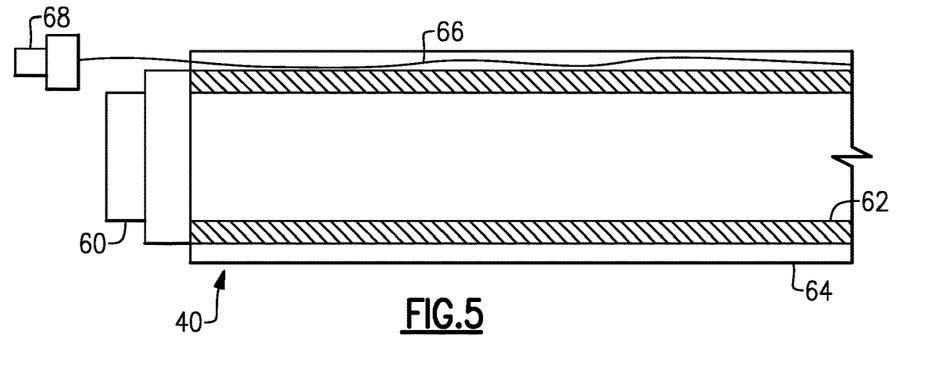
FIG. 5 illustrates a sectioned view of an example hose for a mobile distribution station.

FIG. 5 illustrates a representative portion of one of the hoses 40 and, specifically, the end of the hose 40 that will be located at the fuel tank of the equipment being refueled. In this example, the hose 40 includes a connector 60 at the end for detachably connecting the hose 40 to the integrated fuel cap sensors 50. The hose 40 is formed of a tube 62 and a sleeve 64 that circumscribes the tube 62. As an example, the tube 62 may be a flexible elastomeric tube and the sleeve 64 may be a flexible fabric sleeve. The sleeve 64 is generally loosely arranged around the tube 62, although the sleeve 64 may closely fit on the tube 62 to prevent substantial slipping of the sleeve 64 relative to the tube 62 during use and handling. Optionally, to further prevent slipping and/or to secure the sleeve 64, bands may be tightened around the hose 40. As an example, one or more steel or stainless steel bands can be provided at least near the ends of the hose 40.

A plurality of sensor communication lines 66 (one shown) are routed with or in the respective hoses 40. For instance, each line 66 may include a wire, a wire bundle, and/or multiple wires or wire bundles. In one further example, the line 66 is a low milli-amp intrinsic safety wiring, which serves as a protection feature for reducing the concern for operating electrical equipment in the presence of fuel by limiting the amount of thermal and electrical energy available for ignition. In this example, the line 66 is routed through the hose 40 between (radially) the tube 62 and the sleeve 64. The sleeve 64 thus serves to secure and protect the line 66, and the sleeve 64 may limit spill and spewing if there is a hose 40 rupture. In particular, since the line 66 is secured in the hose 40, the line 66 does not present a tripping concern for workers. Moreover, in rough terrain environments where there are stones, sand, and other objects that could damage the line 66 if it were free, the sleeve 64 shields the line 66 from direct contact with such objects. In further examples, the line 66 may be embedded or partially embedded in the tube 62 or the sleeve 64.

Figure 6:
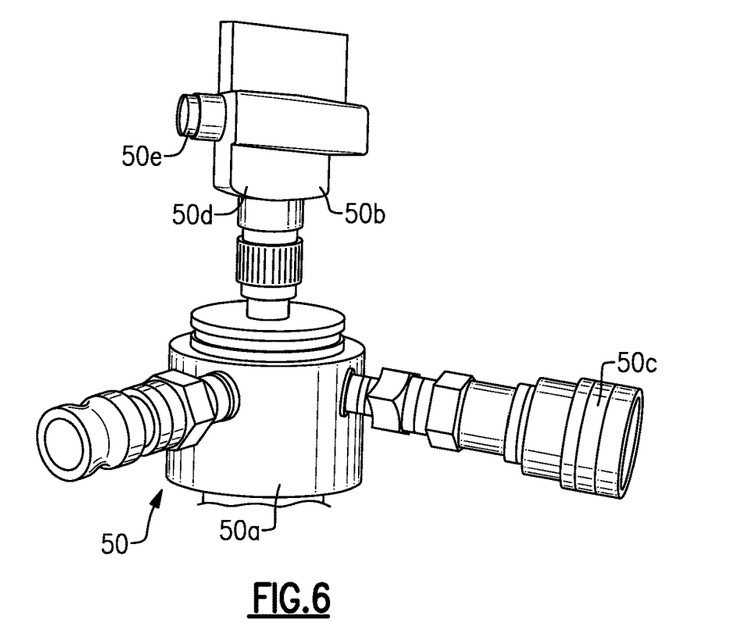
FIG. 6 illustrates an example of an integrated fuel cap sensor for a mobile distribution station.

In this example, the line 66 extends out from the end of the hose 40 and includes a connector 68 that is detachably connectable with a respective one of the integrated fuel cap sensors 50. For example, FIG. 6 illustrates a representative example of one of the integrated fuel cap sensors 50. The integrated fuel cap sensor 50 includes a cap portion 50a and a fluid level sensor portion 50b. The cap portion 50a is detachably connectable with a port of a fuel tank. The cap portion 50a includes a connector port 50c, which is detachably connectable with the connector 60 of the hose 40. The sensor portion 50b includes a sensor 50d and a sensor port 50e that is detachably connectable with the connector 68 of the line 66. The fuel cap sensor 50 may also include a vent port that attaches to a drain hose, to drain any overflow into a containment bucket and/or reduce air pressure build-up in a fuel tank. Thus, a user may first mount the cap portion 50a on the fuel tank of the equipment, followed by connecting the hose 40 to the port 50c and connecting the line 66 to the port 50e.

The sensor 50d may be any type of sensor that is capable of detecting fluid or fuel level in a tank. In one example, the sensor 50d is a guided wave radar sensor. A guided wave radar sensor may include a transmitter/sensor that emits radar waves, most typically radio frequency waves, down a probe. The probe serves as a guide for the radar waves. The radar waves reflect off of the surface of the fuel and the reflected radar waves are received into the transmitter/sensor. A sensor controller determines the "time of flight" of the radar waves, i.e., how long it takes from emission of the radar waves for the radar waves to reflect back to the transmitter/sensor. Based on the time, the sensor controller, or the controller 52 if the sensor controller does not have the capability, determines the distance that the radar waves travel. A longer distance thus indicates a lower fuel level (farther away) and a shorter distance indicates a higher fuel level (closer).

Figure 7:
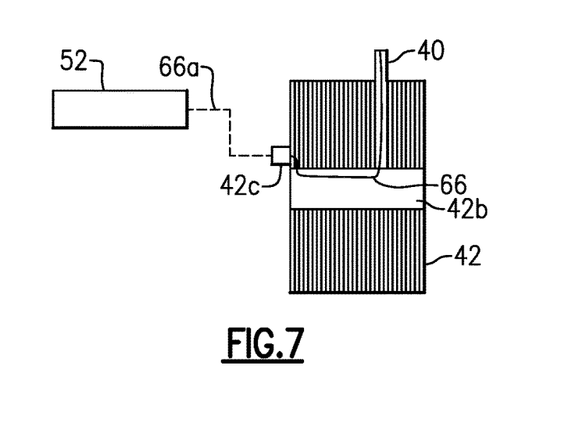
FIG. 7 illustrates an example of the routing of a sensor communication line through a reel in a mobile distribution station.

The line 66 routes through the hose 40 and back to the reel 42 in the trailer 22. For example, the line 66 is also routed or hard-wired through the reel 42 to the controller 52. FIG. 7 illustrates a representative example of the routing in the reel 42. In this example, the reel 42 includes a spindle 42b about which the reel is rotatable. The spindle 42b may be hollow, and the line 66 may be routed through the spindle 42b. The reel 42 may also include a connector 42c mounted thereon. The connector 42c receives the line 66 and serves as a port for connection with another line 66a to the controller 52.

The lines 66a may converge to one or more communication junction blocks or "bricks" prior to the controller 52. The communication junction blocks may serve to facilitate the relay of the signals back to the controller 52. The communication junction blocks may alternatively or additionally serve to facilitate identification of the lines 66, and thus the signals, with respect to which of the hoses a particular line 66 is associated with. For instance, a group of communication junction blocks may have unique identifiers and the lines 66 into a particular communication junction block may be associated with identifiers. A signal relayed into the controller 52 may thus be associated with the identifier of the communication junction blocks and a particular line 66 of that communication junction block in order to identify which hose the signal is to be associated with.

The valves 44 may also communicate with the controller 52 in a similar manner through the communication junction blocks.

Figure 8:
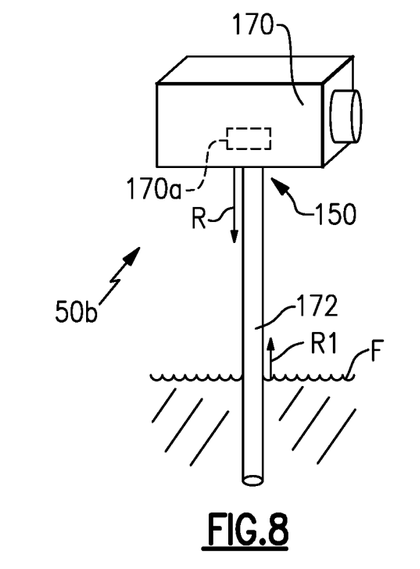
FIG. 8 illustrates an example of a guided wave radar sensor.

FIG. 8 illustrates an isolated view of an example of the fluid level sensor portion 50b. As described above, the portion 50b will typically be integrated with the cap portion 50a. Alternatively, the portion 50b may be separate from the cap portion 50b, as a stand-alone sensor. In this example, the portion 50b is a guided wave radar level sensor 150. The sensor 150 includes a sensor controller 170 and a sensor probe 172 that extends from the sensor controller 170. The sensor controller 170 includes a transmitter/sensor 170a. In this example, the sensor probe 172 is an elongated probe or rod.

The transmitter/sensor 170a emits radar waves (represented at R), most typically radio frequency waves, down the probe 172. The probe 172 serves as a guide for the radar waves. The radar waves reflect off of the surface of the fuel (represented at F) and the reflected radar waves (represented at R1) are received into the transmitter/sensor 170a. The sensor controller 170 determines the "time of flight" of the radar waves, i.e., how long it takes from emission of the radar waves for the radar waves to reflect back to the transmitter/sensor 170a. Based on the time, the sensor controller 170, or the controller 52 if the sensor controller 170 does not have the capability, determines the distance that the radar waves travel. A longer distance thus indicates a lower fuel level (farther away) and a shorter distance indicates a higher fuel level (closer). The sensor 150 may provide high accuracy and reliability in comparison to other types of sensors.

The sensor controller 170 may include hardware, software, or both for calculating the time of flight and distance determination. The sensor controller 170 then transmits a signal to the controller 52 that is indicative of the distance and thus the fluid level. As will be appreciated, the sensor controller 170 may be modified to have a greater or lesser "intelligence" with respect to the amount of computing capability, and a portion or all of the calculating may be conducted by the controller 52. For instance, the transmitted signal may correspond to time of flight data, calculated distance data, or fluid level data, depending on the capability of the sensor controller 170. Determination of whether the fluid level is low or high is conducted by the controller 52.

Figure 9:
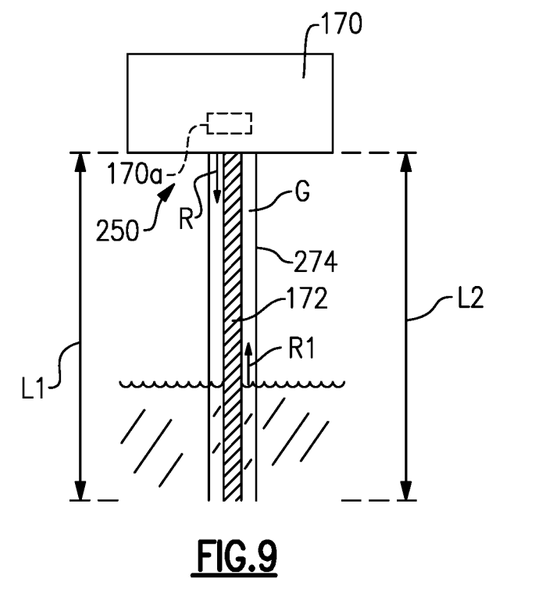
FIG. 9 illustrates another example of a guided wave radar sensor that has a sheath.

FIG. 9 illustrates another example of a guided wave radar level sensor 250. In this disclosure, like reference numerals designate like elements where appropriate and reference numerals with the addition of one-hundred or multiples thereof designate modified elements that are understood to incorporate the same features and benefits of the corresponding elements. In this example, the guided wave radar level sensor 250 includes a sheath 274 that circumscribes the probe 172. For example, the sheath is a metal alloy (e.g., stainless steel or aluminum) or polymer tube that surrounds the probe 172. The sheath 274 shields the probe 172 from contact by external objects, the walls of a fuel tank, or other components in a fuel tank, which might otherwise increase the potential for faulty sensor readings.

In this example, the sheath 274 is spaced apart from the probe 172 such that there is a gap (G) there between. For instance, the sheath 274 and the probe 172 are coaxial such that the gap G is an annular gap. The end of the sheath 274 is open such that the fluid can flow into and out of the gap G as the level changes.

In a further example, the sheath 274 has a sheath length (L1) and the probe 172 has a probe length (L2). The sheath length L2 is equal to or greater than the probe length L2. Use of such a length relationship ensures that the sheath 274 shields the complete length of the probe 172.

Figure 10:
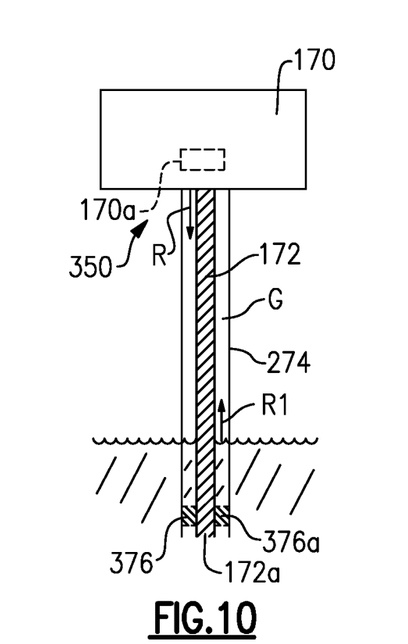
FIG. 10 illustrates another example of a guided wave radar sensor that has a sheath, a probe, and a bushing between the sheath and the probe.

FIG. 10 illustrates another example of a guided wave radar level sensor 350. This example is similar to the sensor 250 but additionally includes a bushing 376 that separates the sheath 274 and the probe 172. As an example, the bushing 376 is formed from a polymer, such as a fuel-resistant polymer (e.g., diesel fuel). The polymer may be, but is not limited to, fluoropolymers such as polytetrafluoroethylene.

The bushing 376 stabilizes the probe 172 with respect to the sheath 274 so that the probe 172 does not come into contact with the sheath 274. On a work site, there may be vibrations or other forces that tend to move the sensor 350. Such movement has the potential to cause a probe to move. Securing the probe 172 relative to the sheath 274 via the bushing 376 facilitates a reduction in the potential for such movement to cause faulty sensor readings.

In this example, the probe 172 extends to a tip end 172a. The bushing 376 is located proximate the tip end 172a. For instance, the bushing 376 may be flush with the tip end 172a, flush with the end of the sheath 274, or flush with both the tip end 172a and the end of the sheath 274. Alternatively, the bushing 376 may be proximate the tip end 172a but inset from the tip end 172a.

Figure 11:
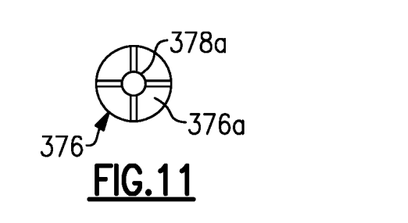
FIG. 11 illustrates an isolated view of a bushing.
Figure 12:
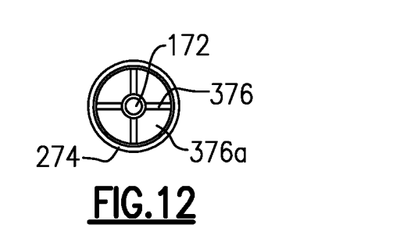
FIG. 12 illustrates an axial view of a bushing between a sheath and a probe.

The bushing 376 may include vents 376a that permit fluid to flow into and out of the gap G. As shown in an isolated view of the busing 376 in FIG. 11, the bushing may include an inner hub 378a, an outer rim 378b, and spokes 378c that extend radially from the hub 378a to the rim 378b. The areas between the spokes 378c are open and serve as the vents 376a. FIG. 12 illustrates an axial view of the bushing in the sensor 350. The hub 378a is hollow and serves as a bearing guide that receives the probe 172 there through. The outer rim 378b serves as an inner bearing guide that is received into the sheath 274. The busing 376 may be interference-fit with the probe 172 via the hub 378a and with the sheath 274 via the outer rim 378b. In a further example, the bushing 376 may be bonded or mechanically secured with the probe 376, the sheath 274, or both.

As can be appreciated from the examples herein, the station 20 permits continuous hot-refueling with enhanced reliability. While there might generally be a tendency to choose wireless sensor communication for convenience, a hard-wired approach mitigates the potential for signal interference that can arise with wireless. Moreover, by hard-wiring the sensors through the hoses to the controller, wired communication lines are protected from exposure and do not pose additional concerns for workers on a site. In addition, the use of guided wave radar sensors may provide high accuracy fuel level readings and thus further enhance reliability of the station 20.

Figure 13:
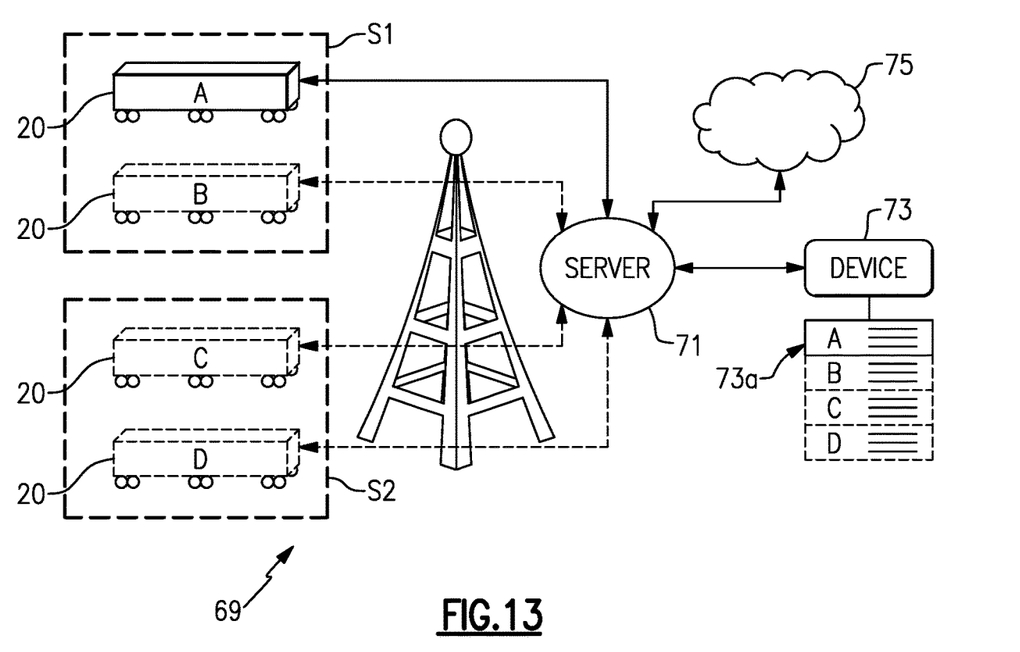
FIG. 13 illustrates a system that can be used to remotely monitor and manage one or more mobile distribution stations.

FIG. 13 illustrates a system 69 for remotely monitoring and/or managing at least one mobile distribution station 20 (A). It is to be appreciated that the system 69 may include additional mobile distribution stations, shown in phantom at 20 (B), 20 (C), and 20 (D) (collectively mobile distribution stations 20), for example. The mobile distribution stations 20 may be located at a single work site or located across several different work sites S1 and S2. Each mobile distribution station 20 is in communication with one or more servers 71 that are remotely located from the mobile distribution stations 20 and work sites S1/S2. In most implementations, the communication will be wireless.

The server 71 may include hardware, software, or both that is configured to perform the functions described herein. The server 71 may also be in communication with one or more electronic devices 73. The electronic device 73 is external of or remote from the mobile fuel distribution stations 20. For example, the electronic device 73 may be, but is not limited to, a computer, such as a desktop or laptop computer, a cellular device, or tablet device. The electronic device 73 may communicate and interact in the system 69 via data connectivity, which may involve internet connectivity, cellular connectivity, software, mobile application, or combinations of these.

The electronic device 73 may include a display 73a, such as an electronic screen, that is configured to display the fuel operating parameter data of each of the mobile distribution stations 20. As an example, the electronic device 73 may display in real-time the operating parameter data of each of the mobile distribution stations 20 in the system 69 to permit remote monitoring and management control of the mobile distribution stations 20. For instance, the operating parameter data may include fuel temperature, fuel pressure, fuel flow, total amount of fuel distributed, operational settings (e.g., low and high fuel level thresholds), or other parameters.

The server 71 may also be in communication with one or more cloud-based devices 75. The cloud-based device 75 may include one or more servers and a memory for communicating with and storing information from the server 71.

The server 71 is configured to communicate with the mobile distribution stations 20. Most typically, the server 71 will communicate with the controller 52 of the mobile distribution station 20. In this regard, the controller 52 of each mobile distribution station 20 may be include hardware, software, or both that is configured for external communication with the server 71. For example, each controller 52 may communicate and interact in the system 69 via data connectivity, which may involve internet connectivity, cellular connectivity, software, mobile application, or combinations of these.

The server 71 is configured to receive operating parameter data from the mobile distribution stations 20. The operating parameter data may include or represent physical measurements of operating conditions of the mobile distribution station 20, status information of the mobile distribution station 20, setting information of the mobile distribution station 20, or other information associated with control or management of the operation of the mobile distribution station 20.

For example, the server 71 utilizes the information to monitor and auto-manage the mobile distribution station 20. The monitoring and auto-management may be for purposes of identifying potential risk conditions that may require shutdown or alert, purposes of intelligently enhancing operation, or purposes of reading fuel or fluid levels in real-time via the sensors 50. As an example, the server 71 may utilize the information to monitor or display fuel or fluid levels, or determine whether the fuel operating parameter data is within a preset limit and send a control action in response to the operating parameter data being outside the preset limit. As will described in further detail below, the control action may be a shutdown instruction to the mobile fuel distribution stations 20, an adjustment instruction to the mobile fuel distribution stations 20, or an alert to the electronic device 73.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
a mobile trailer;
a pump on the mobile trailer;
a manifold on the mobile trailer and connected with the pump;
a plurality of hoses connected with the manifold;
a plurality of valves on the mobile trailer, each of the valves situated between the manifold and a respective different one of the hoses;
a plurality of guided wave radar level sensors, each of the guided wave radar level sensors being associated with a respective different one of the hoses, each of the guided wave radar level sensors including an elongated sensor probe, a sheath circumscribing the elongated sensor probe, and a bushing separating the sheath and the elongated sensor probe, the bushing including an inner hub through which the sensor probe extends, an outer rim, and spokes that extend radially from the inner hub to the outer rim, wherein there are open vents between the spokes; and
a controller configured to communicate with the guided wave radar level sensors and operate the valves responsive to signals from the guided wave radar level sensors.

2. The distribution station as recited in claim 1, wherein the sheath has a sheath length and the elongated sensor probe has a probe length, and the sheath length is equal to or greater than the probe length.

3. The distribution station as recited in claim 1, wherein each of the guided wave radar level sensors includes a sensor controller and the elongated sensor probe extends from the sensor controller to a tip end, and the bushing is located proximate the tip end.

4. The distribution station as recited in claim 1, wherein each of the guided wave radar level sensors is hard-wired through a respective different one of hoses to the controller.

5. The distribution station as recited in claim 1, further comprising a plurality of sensor communication lines, each of the sensor communication lines being connected or connectable with a respective different one of the guided wave radar level sensors, and each of the sensor communication lines being routed with a respective different one of the hoses.

6. The distribution station as recited in claim 1, wherein the bushing is formed of a polymer.

7. The distribution station as recited in claim 1, wherein the bushing is formed of a fluoropolymer.

8. The distribution station as recited in claim 1, wherein the bushing is interference-fit with the probe.

9. A mobile distribution station comprising a pump, a manifold, a plurality of hoses, a plurality of detachably connectable fuel caps connected or connectable with the hoses, a plurality of valves, a plurality of guided wave radar level sensors, and a controller that is configured to operate the valves responsive to signals from the guided wave radar level sensors to provide fuel to the manifold, from the manifold to the valves, and from the valves through the hoses, each of the guided wave radar level sensors including an elongated sensor probe, a sheath circumscribing the elongated sensor probe, and a bushing separating the sheath and the elongated sensor probe, the bushing including an inner hub through which the sensor probe extends, an outer rim, and spokes that extend radially from the inner hub to the outer rim, wherein there are open vents between the spokes.

10. The mobile distribution station as recited in claim 9, wherein the sheath has a sheath length and the elongated sensor probe has a probe length, and the sheath length is equal to or greater than the probe length.

11. The mobile distribution station as recited in claim 9, wherein each of the guided wave radar level sensors includes a sensor controller and the elongated sensor probe extends from the sensor controller to a tip end, and the bushing is located proximate the tip end.

12. The mobile distribution station as recited in claim 9, wherein each of the guided wave radar level sensors is hard-wired through a respective different one of hoses to the controller.

* * * * *